Oct. 5, 1954 R. STUART-WILLIAMS 2,691,152

MAGNETIC SWITCHING SYSTEM

Filed Jan. 13, 1953 3 Sheets-Sheet 1

/ = "A" TURNS IN "P" DIRECTION
\ = "A" TURNS IN "N" DIRECTION

INVENTOR.

RAYMOND STUART-WILLIAMS

BY Morris A. Rabkin

ATTORNEY

/= A TURNS IN P DIRECTION
\= A TURNS IN N DIRECTION

INVENTOR.
RAYMOND STUART-WILLIAMS
BY Morris L. Rabkin
ATTORNEY

Oct. 5, 1954 R. STUART-WILLIAMS 2,691,152

MAGNETIC SWITCHING SYSTEM

Filed Jan. 13, 1953 3 Sheets-Sheet 3

INVENTOR.

RAYMOND STUART-WILLIAMS

BY Morris A. Rabkin

ATTORNEY

Patented Oct. 5, 1954 2,691,152

UNITED STATES PATENT OFFICE 2,691,152

MAGNETIC SWITCHING SYSTEM

Raymond Stuart-Williams, Princeton, N. J., assignor to Radio Corporation of America, a corporation of Delaware Application January 13, 1953, Serial No. 331,094

12 Claims. (Cl. 340—166)

Figure 1:
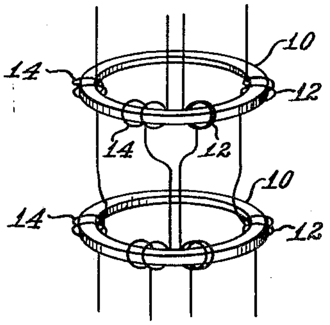

This invention relates to magnetic switches of the type wherein a plurality of magnetic cores have a plurality of selecting coils coupled thereto and more particularly to an improved form of such magnetic switches.

Magnetic switches of the type intended are found described in an article entitled "Static Magnetic Matrix Memory and Switching Circuits," by Jan A. Rajchman, published in the *RCA Review* for June, 1952, and are further described and claimed in application Serial No. 275,622, filed March 8, 1952, entitled "Magnetic Matrix and Computing Devices," by Jan A. Rajchman and assigned to the same assignee.

These switches include a number of magnetic cores, preferably of toroidal shape, and preferably having a substantially rectangular hysteresis characteristic. A number of selecting coils are inductively coupled to all the cores by means of coil windings. The sense of these coil windings is determined in accordance with a desired coupling code. The coils are usually formed in coil pairs, each coil pair representing, in an exemplary code, an order in a binary digit number. If each one of the cores is given a binary number having as many digits as there are coil pairs, then, by a prior arrangement of the sense of the windings in each coil pair, a mode of selection of any one of the cores by selecting the proper coil in each coil pair is provided. As the size of magnetic switches using the structure generally described above is increased, it will be appreciated that the number of coils, and accordingly the number of windings on each core increases considerably. Some thought has been devoted to methods for reducing winding turns upon each core pair. Such a method would both simplify the magnetic switch and reduce its cost.

An object of this invention is to provide a novel, simple and inexpensive magnetic switch.

A further object of this invention is to provide a magnetic switch of the type described which uses fewer winding turns per core than previous types.

Still a further object of this invention is to provide a more efficient magnetic switch.

These and further objects of the invention are achieved by taking advantage of the redundant information provided by using a binary code together with parity checking information.

Coding employing redundant information of the parity check type is coming into extensive use in the field of automatic sequence controlled computers, as it facilitates rapid checking of the correct operation of the machine. Computers today usually have information in a binary coded form which has numeric as well as alphabetic significance. A parity checking system is one in which a digit is added to a binary number so that the total number of ones in the binary number is always an even number if an even parity code is adopted or is always an odd number if an odd parity code is adopted. Thus, all that is required in checking the accuracy of the machine handling the numbers is to count the number of ones in every binary number and determine whether they are odd or even. It is found that by providing, in a magnetic switch, in addition to the binary coded selecting coils an additional pair of coils which convey the parity information the number of turns of the coil windings on the entire switch is considerably reduced, thereby simplifying the switch and improving its efficiency.

The novel features of the invention, as well as the invention itself, both as to its organization and method of operation, will best be understood from the following description when read in connection with the accompanying drawings, in which Figure 1 is a perspective view of toroidal cores and windings shown for the purpose of facilitating the explanation and simplifying the drawings of the invention.

Figure 2:
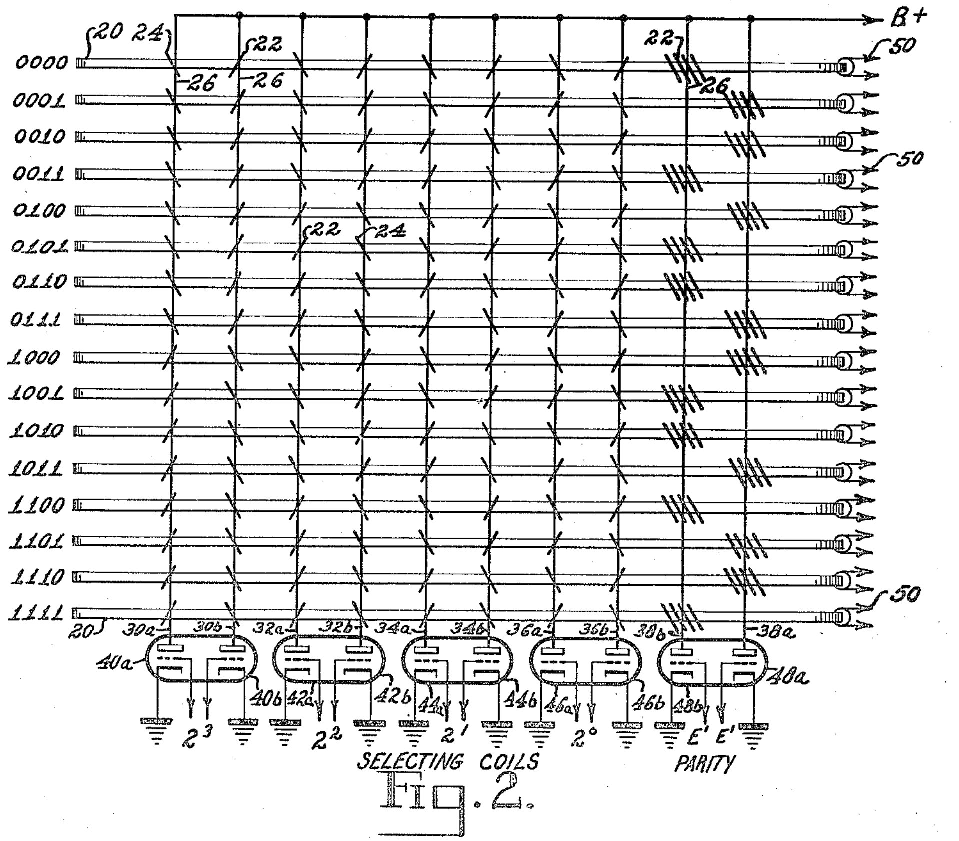

Figure 2 is a schematic drawing of one embodiment of the invention wherein the parity coils are used to assist in inhibiting non-selected cores.

Figure 3:
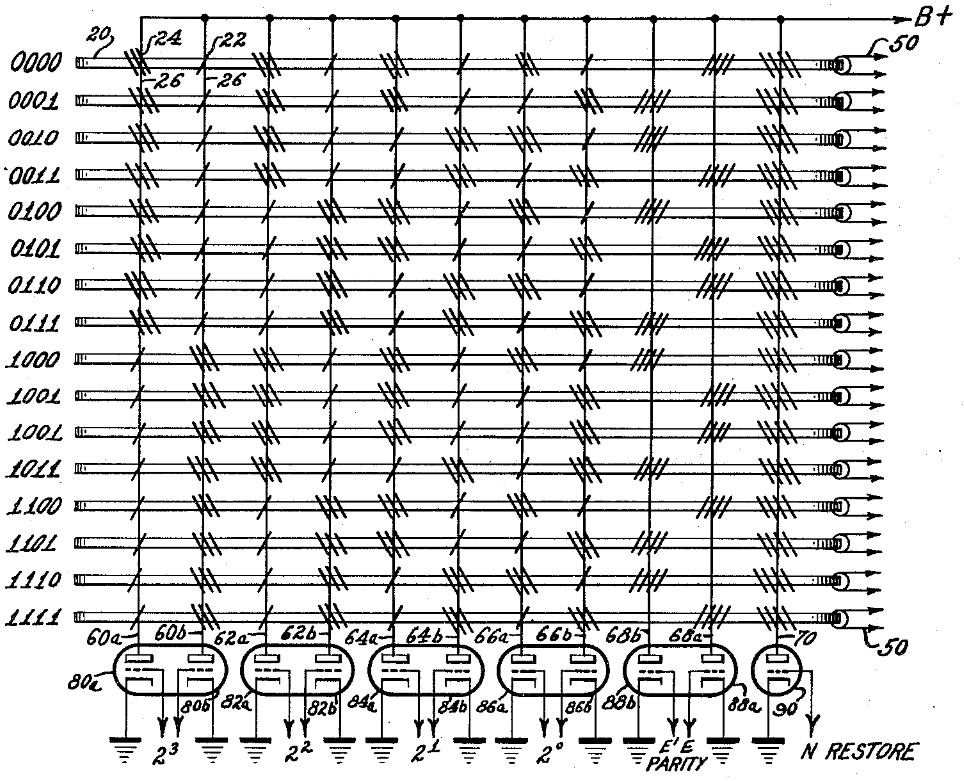
Figure 4:
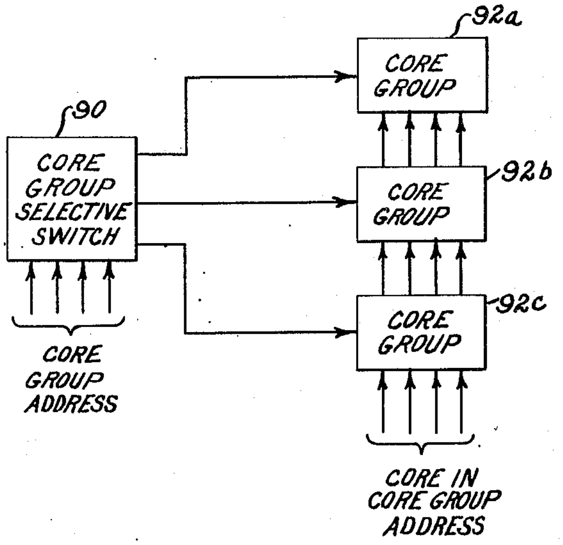
Figure 5:
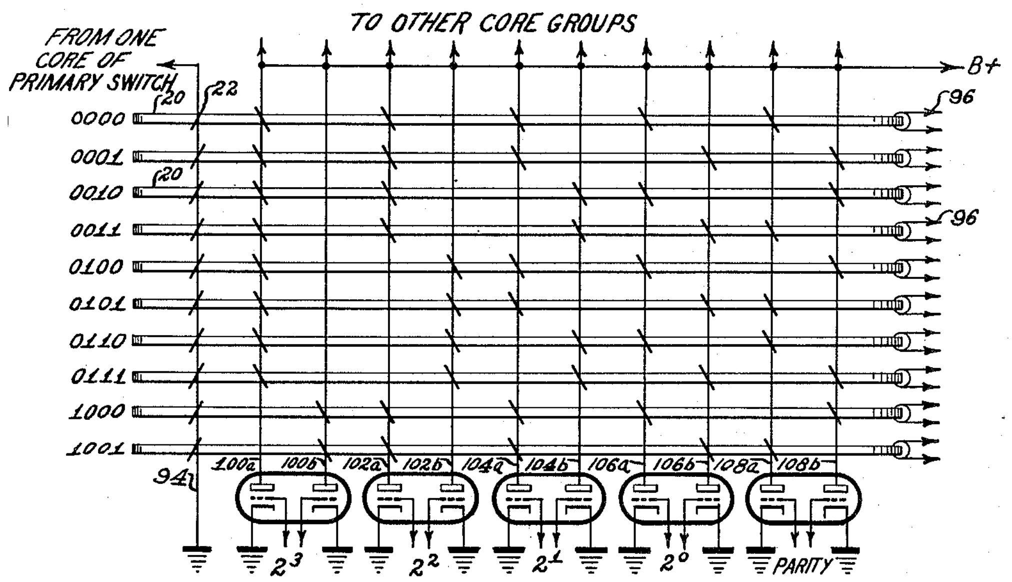
Figure 6:
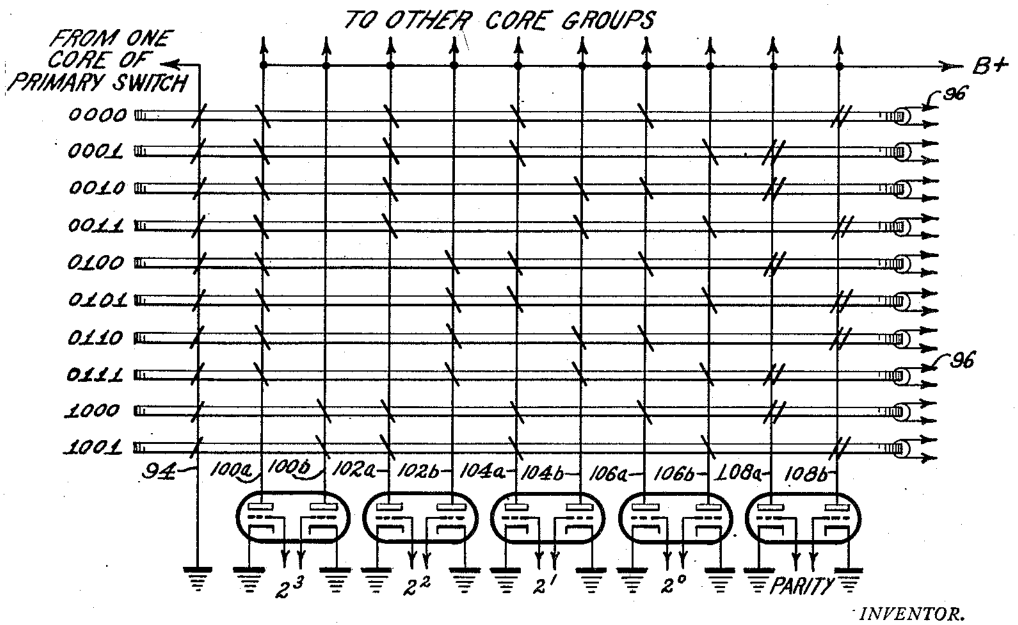

Figure 3 is a schematic drawing of a circuit wherein the parity coils are used to assist in the selection of a desired core, Figure 4 is a schematic diagram of a type of magnetic switch shown for the purpose of assisting in explaining the embodiment of the invention shown in Figs. 5 and 6, and Figures 5 and 6 are two further embodiments of the invention applied to magnetic switches of the type wherein a primary switch drives a secondary type of switch.

Reference is now made to Figure 1, wherein there may be seen two cores 10. These cores are made of magnetic material having a substantially rectangular hysteresis loop. The shape preferred for the cores is toroidal. However, other suitable shapes may be used and it is not intended to limit the invention by this showing of the preferred embodiment. The cores 10 have windings 12, 14 upon them. These windings, when excited by current, provide magnetomotive forces which tend to drive the cores to magnetic saturation at one or the other polarity. The two windings 12 which drive a core in a first direction may have arbitrarily assigned thereto the designation of the "P" windings. The other windings 14 may have the designation of "N" windings. A P winding 12 of one core may be serially connected with an N or P winding of another core to comprise a coil. When the serially connected windings are all of one sense, the coil is designated as an N or P coil, depending upon the sense of the winding.

As is shown in detail and claimed in the above mentioned application Serial No. 275,622, each one of the magnetic cores 10 in a switch has a plurality of P and N windings 12, 14 thereon. The cores are usually placed in the same magnetic starting condition, for example, with an N saturation polarity. The one of the cores 10 which has applied thereto a magnetomotive force in excess of a critical value, will be driven to magnetic saturation having the opposite or P polarity. All other cores do not receive a magnetomotive force in excess of the required critical value and remain in condition N. Some of these cores may also receive a magnetizing force in the direction N, but since they are already saturated in the N direction there is substantially no change in their magnetic condition. By proper selection of the ratio of turns for the P windings 12 and the N windings 14, it is possible to construct a switch wherein a selected core receives a substantial P magnetomotive force. All other cores receive either no magnetomotive force at all or else receive a magnetomotive force in the direction N. The method for determining selection and the number of winding turns is described and claimed in the aforesaid application Serial No. 275,622.

For the purpose of maintaining clear the terminology used herein, a coil may be defined as consisting of a number of windings of the same or different sense which are connected in series. Therefore the windings on each of the cores may be interconnected in series (each winding connected with a different winding on another core) to form a coil. The sense of the winding is to be understood as the direction in which the turns are wound upon a core. Accordingly, windings in a "P" sense have turns wherein a current will cause a magnetomotive force to be generated which will drive or tend to drive the core towards magnetic saturation in a direction P. Windings which are said to have an N sense have turns wherein a current will cause a magnetomotive force to be generated which will drive or tend to drive the core towards magnetic saturation in a direction N.

In view of the difficulties entailed in showing the winding turns on each of a large number of cores, a modified representation of the cores and the windings is made in Figures 2, 3, 5 and 6, in order to preserve simplicity in the drawings and to provide a readily understood drawing. The convention adapted for these drawings is that the cores are represented by elongated rectangles such as those designated by the reference numerals 20. The coil windings are represented by the lines 22, 24 that pass at an angle through a rectangle. A line 26 through these angle lines represents the interconnection of the windings in series to form coils 30*a,b*–38*a,b*. The lines which form an obtuse angle to the left with a core, such as is identified by reference numeral 24, represents a winding providing a magnetomotive force in the direction N. If the obtuse angle is to the right, as identified by reference numerals 22, the line represents a winding providing a magnetomotive force in the direction P. More than one line represents a larger number of turns than the basic turns. This will become more clear with the subsequent description.

Referring now to Fig. 2, there may be seen a plurality of magnetic cores 20 and, for purposes of facilitating this explanation, it is assumed that each one of the cores has associated therewith a binary number ranging from 0000 to 1111, as shown in the drawing. A number of pairs of selecting coils 30*a,b*–36*a,b* are provided. Each pair of selecting coils has assigned thereto an order $2^0$–$2^3$ in the core binary numbers. There is also provided a pair of parity coils 38*a,b* which serve an inhibiting function. On each core 20 there is an output winding 50 which can be coupled to a utilization circuit. Each one of the selecting and parity coils is a plate load for a different vacuum tube 40*a,b*–48*a,b*. These tubes are usually maintained non-conductive. Accordingly, excitation of the coils may be selectively performed by applying addressing signals to the grids of the various vacuum tubes 40*a,b*–48*a,b*, to render the selected tubes conductive. The operation of the switch is performed by selecting one coil from each one of the pairs of selecting coils, as well as one coil from the parity coils. Signals are applied to the tubes connected to the desired selecting coils, so that they are rendered conducting. The winding logic which is adopted for Fig. 2 is shown in Table I below:

*Table I*

| Core No. | Selecting Coil | | | | Winding Sense | | | | Parity Coil Windings | |
|---|---|---|---|---|---|---|---|---|---|---|
| | $2^3$ | | $2^2$ | | $2'$ | | $2^0$ | | E′ | E |
| | 30*a* | 30*b* | 32*a* | 32*b* | 34*a* | 34*b* | 36*a* | 36*b* | 38*b* | 38*a* |
| 0000 | N | P | N | P | N | P | N | P | 4N | ------ |
| 0001 | N | P | N | P | N | P | P | N | ------ | 4N |
| 0010 | N | P | N | P | P | N | N | P | ------ | 4N |
| 0011 | N | P | N | P | P | N | P | N | 4N | ------ |
| 0100 | N | P | P | N | N | P | N | P | ------ | 4N |
| 0101 | N | P | P | N | N | P | P | N | 4N | ------ |
| 0110 | N | P | P | N | P | N | N | P | 4N | ------ |
| 0111 | N | P | P | N | P | N | P | N | ------ | 4N |
| 1000 | P | N | N | P | N | P | N | P | ------ | 4N |
| 1001 | P | N | N | P | N | P | P | N | 4N | ------ |
| 1010 | P | N | N | P | P | N | N | P | 4N | ------ |
| 1011 | P | N | N | P | P | N | P | N | ------ | 4N |
| 1100 | P | N | P | N | N | P | N | P | 4N | ------ |
| 1101 | P | N | P | N | N | P | P | N | ------ | 4N |
| 1110 | P | N | P | N | P | N | P | N | ------ | 4N |
| 1111 | P | N | P | N | P | N | P | N | 4N | ------ |

The logic for the table is as follows: Assume that when the windings of a coil pair on a core have the order N—P (lines 24—22) then a binary zero is represented in that coil pair order position on the core. When the windings of a coil pair on a core have the order P—N (lines 22—24) then a binary one is represented in that coil pair order position on the core. For operation of the switch, all the cores are initially saturated in condition N. In order to select a particular core for drive to condition P, all the selected coils are selected for excitation which have P sense windings on that particular core. From the above logic and from the table it may be seen that whenever a one is called for in any one of the coil pair order positions, so that a desired core number is represented, one coil 30a–38a of each coil pair is always excited. These may be called "one" coils and are designated by the "*a*" associated with the reference numbers of the coil pairs. The other coil of the coil pairs is known as a "zero" coil, is always excited when a zero occurs in the coil order number and is designated by the "*b*" associated with the reference numbers of the coils.

As described thus far, with the exception of the parity coils, the switch is substantially identical with the magnetic switch which is described in the above noted publication and application. It resembles Fig. 1 in the application.

For the purpose of explaining this invention, assume that an odd parity convention is adopted. A pair of parity coils designated as 38a and 38b are provided which have the sense of their windings on the cores in this embodiment of the invention in an N going or inhibiting direction. Accordingly, with the odd parity selected, an N going winding in the parity coil 38a which is called the "one" parity coil, will occur on every core having an odd number of digits and an N going winding will occur in the 38b or zero parity coil on every core having an even number of ones in the associated binary number.

In the operation of this switch, selection of a core to be driven from magnetic saturation in one direction to magnetic saturation in the opposite direction is made by first considering the core number, then exciting in each of the selecting coil pairs either the "one" or "zero" coil required to represent the number of the core by means of the coil pairs. The "one" coil of the parity coils is also excited if a parity digit is required for the core order selected. The "zero" core of the parity coils is excited if a parity digit is not required. Thus, if it is desired to select core number 0110, then the following coils are excited: *30b, 32a, 34a, 36b, 38a*. It is to be noted that only the windings having a P sense are excited on the selected core. No N sense windings are excited. Accordingly, this core number 0110 is driven from saturation in the N polarity to saturation in the P polarity. All other cores in the magnetic switch have at least one or more N windings excited as well as less than four P windings excited. Accordingly, they do not receive a sufficient magnetomotive force to drive them from saturation in the N polarity in which they are initially set.

Let it be assumed that there are $m$ information channels required in a magnetic switch. The information channels correspond to the binary orders. Let it further be assumed that each parity winding 38a, b, contains C turns in the N direction on each core to which it is coupled, that each selecting coil winding contains B turns in the N dircetion, and that each selecting coil winding contains A turns in the P direction on each core to which it is coupled. The $m$ information windings relate only to the selecting coil pairs and do not include the parity coils. Accordingly, the total P drive on a selected core will have $m$A turns. Consider the next most significant unselected core. This core or cores may be best illustrated by an example: If core number 0111 is selected, then the next most significant unselected cores are, for example, core 0100, core 0010 and core 1001. The most significant unselected cores are the ones which, next to the selected core, receive the greatest magnetomotive drive in a P direction as a result of exciting the selecting coils. These cores differ in one digit from the selected core and hence the parity winding affects them. The next most significant unselected cores are those which next to the most significant unselected core receive the greatest magnetomotive drive in the P direction as a result of exciting the selecting coils. These coils differ in two digits from the seleted core, and hence the parity winding does not affect them. The total P direction drive on any one of these next most significant unselected cores is $(m-2)A$ turns. The total N direction drive is 2B turns. Hence, to have these cores remain unselected, $2B \geqq (m-2)A$. Accordingly, in order to have complete cancellation of the magnetomotive forces applied to these cores, for the situation where $m=4$ as illustrated in Fig. 2, $B=A$, as shown. For a situation where $m$ would equal 6, B would equal 2A.

If we now consider the most significant unselected cores, namely, cores 0110 or 1110, etc., then the total P drives of these cores is $(m-1)A$. The total N drive on these cores is $B+C$. To prevent these cores from being driven $B+C \geqq (m-1)A$. This defines the minimum value of C which minimum is always less than $m$A. However, by inspecting the magnetic switch shown in Fig. 2, it will be seen that the parity coils have an N winding on every core. Accordingly, if the number of turns C is made equal to $m$A, then no N restore winding is required to position each one of the cores in the condition N. The parity windings are both excited together to restore all the cores to condition N. Thus, there is a saving in the number of turns on a core by eliminating the N restore coil windings. If, accordingly, the number of turns in a parity winding is made equal to $mA$ in the N direction and the number of P and N turns on the selecting coils is made equal to A, then the total number of turns employed per core is $mA+mB+C$, which, in the case of the four-channel switch shown in Fig. 2, is a total of $3mA$ turns. Expressed generally, $$mA+mB+C=mA+m\left(\frac{m}{2}-1\right)A+mA=m\left(\frac{m}{2}+1\right)A$$

This compares favorably with, and is a saving over, a total of $m(m+1)$A turns required in the normal switch described in application Serial No. 275,622 referred to above.

Referring now to Fig. 3, there is shown a switch wherein the parity windings 88a, b are used, not to inhibit, but to assist the selection. The operation of the switch is substantially the same as is described for the switch shown in Fig. 2. The parity coils 88a, b in this switch, however, cannot be used for an N restore function. The similarity between Figures 2 and 3 is only in the sense of the windings which are used to express the core numbers 0000–1111. It will be noted, however, that the N going windings 24 have three times as many turns as were shown in the selecting coils in Fig. 2. The parity windings have four times as many A turns as opposed to three times as many A turns in Fig. 2. Since, in this switch, the sense of the parity coil windings is chosen to assist in the selection of a core, a P winding will be placed on a core where a one digit is required to express the odd parity. This is the opposite of the case where the parity coils served an inhibiting function. As an example, core number 0110 requires a parity digit in order to make the total number of ones odd, and therefore the parity coil 68$a$ will have a winding in the P sense on that core. Table II shows the winding code used.

*Table II*

| Core No. | Selecting Coil Windings | | | | | | | | Parity Coil Windings | |
|---|---|---|---|---|---|---|---|---|---|---|
| | $2^3$ | | $2^2$ | | $2'$ | | $2^0$ | | E′ | E |
| | 60$a$ | 60$b$ | 62$a$ | 62$b$ | 64$a$ | 64$b$ | 66$a$ | 66$b$ | 68$b$ | 68$a$ |
| 0000 | 3N | P | 3N | P | 3N | P | 3N | P | ----- | 4P |
| 0001 | 3N | P | 3N | P | 3N | P | P | 3N | 4P | ----- |
| 0010 | 3N | P | 3N | P | P | 3N | 3N | P | 4P | ----- |
| 0011 | 3N | P | 3N | P | P | 3N | P | 3N | ----- | 4P |
| 0100 | 3N | P | P | 3N | 3N | P | 3N | P | 4P | ----- |
| 0101 | 3N | P | P | 3N | 3N | P | P | 3N | ----- | 4P |
| 0110 | 3N | P | P | 3N | P | 3N | 3N | P | ----- | 4P |
| 0111 | 3N | P | P | 3N | P | 3N | P | 3N | 4P | ----- |
| 1000 | P | 3N | 3N | P | 3N | P | 3N | P | 4P | ----- |
| 1001 | P | 3N | 3N | PP | 3N | P | P | 3N | ----- | 4P |
| 1010 | P | 3N | 3N | P | P | 3N | 3N | P | ----- | 4P |
| 1011 | P | 3N | 3N | P | P | 3N | P | 3N | 4P | ----- |
| 1100 | P | 3N | P | 3N | 3N | P | 3N | P | ----- | 4P |
| 1101 | P | 3N | P | 3N | 3N | P | P | 3N | 4P | ----- |
| 1110 | P | 3N | P | 3N | P | 3N | 3N | P | 4P | ----- |
| 1111 | P | 3N | P | 3N | P | 3N | P | 3N | ----- | 4P |

It it is desired to select core 0111, for example, then first the N restore coil is excited. Following this operation which resets the switch, coils 60$b$, 62$a$, 64$a$ and 66$a$ are excited by applying the proper exciting signals to the grids of their associated tubes, 80$b$, 82$a$, 84$a$ and 86$a$. Since there is an odd number of ones in the core number coil 68$b$ is also excited by applying a signal to its driving tube 78$b$. Only the P windings on core 0111 are excited and consequently it will be driven to magnetic saturation having a P polarity.

A core which is selected, in the switch shown in Figure 3, has $mA+C$, "P" winding turns which are excited. The most significant unselected core has a total of $(m-1)A-B$ turns which are excited thereon and the second significant unselected core has a total of $(m-2)A+C-2B$ turns excited. Both of these latter quantities must be zero or negative in order that these cores remain unaffected by a selection. Hence $$B=(m-1)A$$
$$C=mA$$

Since the total P drive is $2mA(mA+mA)$, a separate N restore coil 70 having $2m$A winding turns must be provided. Then the total turns per core are $A$ turns$+B$ turns$+N$ restore$+C$ turns$=$ $$mA+m(m-1)A+mA+2mA=m(m+3)A$$

In this case, however, the drive is double the previous case and for the same input current A may be half the value in the previous case. Using this value of A the number of turns may be $$m\left(\frac{m}{2}+1\right)A+\frac{mA}{2}$$

Hence, although this type of switch is more efficient than that employed in application Serial No. 275,622, it is less efficient than the type first described in Figure 2.

It should be noted that an N restore 70 coil is required in view of the fact that the parity coils have their turns in a P direction. This N restore coil is usually excited prior to each core selection operation.

From a consideration of the previous two switch types, it is obvious that the parity winding can be used both to aid and inhibit. If, for example, each parity coil consisted of windings in both directions, but arranged to aid the selected core and inhibit the unselected core, and if for this example there were C turns on both N and P windings used for parity, then the selected core drive is $$mA+C$$

On the most significant unselected core it is $$(m-1)A-B-C$$

On the second most significant unselected core it is $$(m-2)A+2B+C$$

As before, the two latter quantities must be zero or negative. Then $$B=\left(\frac{2m}{3}-1\right)A$$

$$C=\frac{m}{3}A$$

Total drive is $$\frac{4m}{3}A$$

and therefore an N restore winding of $$\frac{4m}{3}A$$

is required.

Therefore total turns per core are $$mA+m\left(\frac{2m}{3}-1\right)A+\frac{2m}{3}A+\frac{4m}{3}A=m(2m+6)\frac{A}{3}$$

However, as before, the drive has been increased, and therefore for the same input current A may be reduced to ¾A of that used in Type 1, so total turns become $$m\left(\frac{m}{2}+1\right)A+\frac{Am}{2}$$

This switch is less efficient than that shown in Figure 2.

In all three types of switches described above it is often possible to bring about N restoration by driving all the $2m$ information channels or selecting coils simultaneously.

*Type 1.*—Considering the switch shown in Figure 2:

If all information windings are driven simultaneously, then N drive is $$m\left(\frac{m}{2}-1\right)A-mA=m(m-4)\frac{A}{2}$$

This will produce satisfactory N restore action if $$m(m-4)\frac{A}{2}\geq mA \text{ or } m\geq 6$$

Hence, for large switches this method of N restore is of value and this permits a reduction in the parity winding turns from $m$A to the lowest theoretical value which is $mA/2$. This reduces the total number of turns required on the core to $$m(m+1)\frac{A}{2}$$

which is one half the total number of turns required for the previously known switch and is less than $$m\left(\frac{m}{2}+1\right)A$$

the number of turns for the switch shown in Figure 2.

It is also possible, of course, to restore the cores to N by driving the parity coils at the same time as the information channel coils are driven. The total N drive is, $$m\left(\frac{m}{2}-1\right)A-mA+\frac{mA}{2}=m(m-3)\frac{A}{2}$$

and this will produce satisfactory N restore action if $$m(m-3)\frac{A}{2}\geq mA$$

or $$m\geq 5$$

*Type 2.*—Considering the type of switch shown in Figure 3:

If the N restore coil 70 is removed from the cores and all information channels but not the parity channel are driven simultaneously, then the total N drive on each core is Total B drive—Total P drive=

$$m(m-1)A-mA=m(m-2)A$$

This will produce satisfactory N restore if $$m(m-2)A\geq 2mA$$

where $2mA$ is the total P drive received by any selected core or $$m\geq 4$$

Using the type of N restore drive suggested and removing the N restore coil, the number of turns per core is Total A drive cores+Total B+Total C=

$$mA+m(m-1)A+mA=m(m+1)A$$

But since, as previously shown, the P drive is doubled, A may be reduced to $A/2$. Comparing this switch with the switch shown in Figure 2, the turns are the same on each core, namely $$m(m+1)\frac{A}{2}$$

This type of switch is the most efficient switch so far described as it employs half the wire that is required in the normal switch described in application Serial No. 275,622. However, the N restore is made by driving all the selecting coils or information channels simultaneously. In the case of the switch which employs parity coils having both P and N windings (not shown), as in the previous cases an improvement in efficiency can be obtained, the exact value depending on the method of connecting the parity windings. In all cases, however, this switch under these circumstances is less efficient than Type 2 and more efficient than Type 1.

Reference is now made to Fig. 4. This is a schematic of an invention which is described in detail and claimed in application Serial No. 327,234 filed December 22, 1952, by Jan A. Rajchman and assigned to this assignee. The type of switch which is shown therein comprises a primary magnetic switch 90 which may, for example, be of the type shown in Figs. 2 or 3 herein, and is designated as a core group selective switch. Any one of the cores in this switch may be selected by applying signals to the selecting coils via the core group address input in the same manner as has been described previously. Each one of the cores in the primary switch has its output coil connected to a different group of cores 92*a*, *b*, *c* in such a manner that when one of the cores of the primary switch is driven from N to P, a P driving magnetomotive force is applied to all of the cores in the particular core group to which it is coupled. A second input is applied to all of the cores in all of the core groups via the coil in the core address input. This second input is in the nature of an inhibiting input and inhibits all the cores but a selected core in each of the groups of cores. This selected core is the only one which is capable of being driven from N to P. However, the only one of the selected cores which is actually so driven is the one in the core group which receives a P drive from the primary switch. Restoration of the cores of the core group to condition N is made by restoring the cores in the primary switch. The principle of the utilization of the redundancy found in the parity code for the purpose of reducing the number of turns required in a magnetic switch may be used both in the primary switch and also may be extended to the core groups to advantage.

Figure 5 is a schematic diagram of one of the core groups 92*a* or *b* or *c*. It shows a number of cores 20 having a common P going drive which is provided by the output coil 94 from one of the cores in the primary switch (not shown). Each one of the cores in the core group has its own output coil 96. Each one of the cores in the group is assigned a binary number from 0000 to 1001. Four pairs of selecting coils 100*a*,*b*–106*a*,*b* are provided as well as a pair of parity coils 108*a*,*b*. The convention used with this switch is that, where a zero is called for in a core number, the selecting coils in the order for each digit of that core number will not have an N going winding on the zero coil, but will have an N going winding on the one coil. Likewise, when the core binary number calls for a one in a binary order position, the selecting coils which are assigned that order have an N going winding included in the zero coil and no N going winding included in the one coil. Since the sense of the parity winding is negative and the odd parity is still adopted, the numbers having an even number of ones do not have a parity winding in the one parity coil, the binary numbers having an odd number of ones will have an N going winding in the one parity coil. A winding chart is shown below in Table III to clarify further the convention chosen.

*Table III*

| Core No. | Selecting Coil Windings | | | | | | | | Parity Coil Windings | |
|---|---|---|---|---|---|---|---|---|---|---|
| | $2^3$ | | $2^2$ | | $2'$ | | $2^0$ | | E′ | E |
| | 100*a* | 100*b* | 102*a* | 102*b* | 104*a* | 104*b* | 106*a* | 106*b* | 108*b* | 108*a* |
| 0000 | N | ---- | N | ---- | N | ---- | N | ---- | N | ---- |
| 0001 | N | ---- | N | ---- | N | ---- | ---- | N | ---- | N |
| 0010 | N | ---- | N | ---- | ---- | N | N | ---- | ---- | N |
| 0011 | N | ---- | N | ---- | ---- | N | ---- | N | N | ---- |
| 0100 | N | ---- | ---- | N | N | ---- | N | ---- | ---- | N |
| 0101 | N | ---- | ---- | N | N | ---- | ---- | N | N | ---- |
| 0110 | N | ---- | ---- | N | ---- | N | N | ---- | N | ---- |
| 0111 | N | ---- | ---- | N | ---- | N | ---- | N | ---- | N |
| 1000 | ---- | N | N | ---- | N | ---- | N | ---- | ---- | N |
| 1001 | ---- | N | N | ---- | N | ---- | ---- | N | N | ---- |

In operation, all the cores in a selected one of the core groups, of which the core group shown in Figure 5 is typical, receive P drives from the output coil 94 connected to the selected core in the primary switch group. The one of the cores in the selected core group which it is desired to permit to be driven to P does not have any excited inhibiting windings coupled to it. Accordingly, as an illustration, if it is desired to permit core 0101 to be driven, then the following coils are excited: 100*b*, 102*a*, 104*b*, 106*a*, 108*a* by applying the proper signals to their associated driving tubes. It will then be appreciated that core 0101 is the only one of the core group that does not have any inhibiting windings excited and accordingly is the only one that can be driven from condition N to P. Thus a voltage is induced in the output winding 96 of the driven core only, which voltage can be utilized for any desired purpose.

Assume that the P drive on each of the cores is $m_1$. Assume further that there are C turns for each parity coil winding where required. Assume that, as before, the parity winding that is energized is arranged to inhibit the most significant unselected cores. Then the P drive on the chosen core is $m_1$A. The total drive on one of the most significant unselected cores is $$m_1A-B-C$$

The drive on the next most significant unselected core is $m_1A-2B$. Both of these latter quantities must be zero or negative for correct action. Then $$B \geq \frac{m_1A}{2}$$

$$C \geq \frac{m_1A}{2}$$

Hence, the minimum number of winding turns on a core which has a P drive of $m_1$A is $$\text{Drive} + \text{Output windings} + \frac{m_2m_1A}{2} + \frac{m_1A}{2}$$

$$= \text{Drive} + \text{Output} + \frac{m_1A}{2}(m_2+1)$$

where $m_2$ is the number of information channels in a switch (4 for switch shown).

Matters may also be arranged to have the parity coils 108*a*, 108*b* assist the drive from the primary switch. This arrangement is shown in Fig. 6 of the drawings. The convention adopted for the selecting coils 100*a*,*b*–106*a*,*b* is the same. The parity coil windings 108*a*, 108*b* are in a P going direction and, as shown, these have twice the number of turns of the parity coil windings shown in the drawing in Fig. 5. Table IV shows the winding code chosen for this particular switch:

*Table IV*

| Core No. | Selecting Coil Windings | | | | | | | | Parity Coil Windings | |
|---|---|---|---|---|---|---|---|---|---|---|
| | $2^3$ | | $2^2$ | | 2′ | | $2^0$ | | E′ | E |
| | 100*a* | 100*b* | 102*a* | 102*b* | 104*a* | 104*b* | 106*a* | 106*b* | 108*b* | 108*a* |
| 0000 | N | ----- | N | ----- | N | ----- | N | ----- | ----- | 2P |
| 0001 | N | ----- | N | ----- | N | ----- | ----- | N | 2P | ----- |
| 0010 | N | ----- | N | ----- | ----- | N | N | ----- | 2P | ----- |
| 0011 | N | ----- | N | ----- | ----- | N | ----- | N | ----- | 2P |
| 0100 | N | ----- | ----- | N | N | ----- | N | ----- | 2P | ----- |
| 0101 | N | ----- | ----- | N | N | ----- | ----- | N | ----- | 2P |
| 0110 | N | ----- | ----- | N | ----- | N | N | ----- | ----- | 2P |
| 0111 | N | ----- | ----- | N | ----- | N | ----- | N | 2P | ----- |
| 1000 | ----- | N | N | ----- | N | ----- | N | ----- | 2P | ----- |
| 1001 | ----- | N | N | ----- | N | ----- | ----- | N | ----- | 2P |

It is to be noted that in the operation of the secondary switches shown in Figure 5 and Figure 6, one selecting coil in each pair of selecting coils is excited as well as the proper one of the parity coils simultaneously with the excitation of the primary switch (not shown). Excitation is provided by applying signals to the grids of the proper ones of the vacuum tubes for which proper selecting and parity coils serve as plate loads. In the drawing of the switch shown in Fig. 6, the P drive on a chosen core is $m_1A+C$. Since the parity coils in the embodiment shown assist the P drive, the drive on the most significant unselected core is $m_2A-B$. The drive on the next most significant interfering core is $m_1A+C-2B$. Hence $$B \geq m_1A$$

$$C \leq m_1A$$

Hence, the minimum number of winding turns per core required for a secondary switch of this type is, for a P drive of $2m_1$A $$\text{Drive}+\text{Output winding}+m_2m_1A+m_1A$$

$$=\text{Drive}+\text{Output winding}+m_1A(m_2+1)$$

Hence, very nearly twice the number of turns are required for twice the drive and hence this secondary switch is slightly more efficient than that shown in Figure 5.

It is possible to design a secondary switch in which the parity coil windings include both P and N winding turns. The number of turns required and the efficiency of such a switch is shown below.

Assume, in parity coils having both P and N sense windings, that there are $C_1$ turns on a core having a P sense where a P winding is required, and $C_2$ turns in an N sense where an N winding is required. These windings of course are excited when one or the other of the parity windings is selected. Then the drive on a chosen core is $m_1A+C_1$. The drive on the most significant unselected core is $m_1A-B-C_2$. The drive on the next most significant unselected core is $m_1A-2B+C_1$. Both of these latter quantities must be zero or negative and, if some relation between $C_1$ and $C_2$ is known, then the number of turns required may be solved. To illustrate the action it will be assumed that $C_1=C_2$. Then $$B=\tfrac{2}{3}m_1A$$

$$C_1=C_2=\tfrac{1}{3}m_1A$$

$$\text{Drive is } \tfrac{4}{3}m_1A$$

Number of turns per core for this drive is $$\text{Driving Coil} + \text{Output Winding} + \tfrac{2}{3}\,m_1Am_2+\tfrac{2}{3}m_1A=\text{Driving Coil} + \text{Output Winding} + \tfrac{2}{3}\,m_1A(m_2+1)$$

This switch is slightly more efficient than the type shown in Figure 5 but less efficient than the type shown in Figure 6.

No N restore coil is normally required on secondary switches since the primary switch provides the N restore drive when it is reset. However, in view of the increased P drive available in the secondary switch shown in Figure 6 which is of the type where the parity coil assists the P drive, it is necessary to drive one pair of the selecting coils to supplement the N restore action of the primary switch.

There has been shown and described herein a novel, useful, and economical magnetic switch which utilizes the redundant information provided by parity codes for the purpose of reducing the number of winding turns required to obtain efficient utilization of a magnetic switch.

What is claimed is:

1. A magnetic switch comprising a plurality of magnetic cores, each core having a corresponding different binary number assigned thereto, a plurality of pairs of selecting coils, each pair of selecting coils having a corresponding binary number order position assigned thereto, each pair of selecting coils being inductively coupled by windings to each core, the sense of the windings of each pair of coils on a core being opposite and having one winding order on a core to represent a binary one digit and the opposite winding order on a core to represent a binary zero digit, a pair of parity digit coils, one of said coils being inductively coupled by windings to certain ones of the cores as determined by a desired parity code, the other of said coils being inductively coupled by windings to the cores to which said one of said parity coils is not coupled, means to selectively excite one of each of said pairs of selecting coils and one of said parity coils to drive from magnetic saturation in one polarity toward magnetic saturation in the opposite polarity the one of said plurality of cores having the same binary number and parity as represented by the excited coils, and means to establish all said cores in said one polarity of magnetic saturation.

2. A magnetic switch as recited in claim 1 wherein all the windings in said parity coils have the same winding sense and said means to establish all said cores in said one polarity of magnetic saturation includes means to apply currents simultaneously to said pair of parity coils.

3. A magnetic switch comprising a plurality of magnetic cores, a plurality of pairs of selecting coils, each pair of selecting coils having a binary number order position assigned thereto, each pair of selecting coils including a different pair of windings on each core, each pair of windings included in a coil pair being of opposite sense, one sense being designated as P and the opposite sense as N, the order of the winding pairs on a core being P—N or N—P in accordance with a desired binary code for coupling said coils to said cores, said winding orders on each core representing a binary number, a pair of parity digit coils, one of said coils being inductively coupled by windings to certain ones of said cores as determined by a desired parity relationships to the binary coupling code, the other of said parity coils being coupled by windings to the remaining ones of said cores, the sense of said windings in said parity coils being the same, means to selectively excite one of each of said pairs of selecting coils and one of said parity coils to drive from magnetic saturation in one polarity toward magnetic saturation in the opposite polarity the one of said plurality of cores upon which only the windings having a P sense are excited, and means to establish all said cores in said one polarity of magnetic saturation.

4. A magnetic switch as recited in claim 3 wherein all the windings of said parity coils are wound in an N sense, and inhibit all but the selected core, and said means to establish said cores in said one polarity of magnetic saturation includes means to apply currents simultaneously to said pair of parity coils.

5. A magnetic switch as recited in claim 3 wherein all the windings of said parity coils are wound in a P sense and assist the drive to a selected core, and said means to establish said cores in said one polarity of magnetic saturation includes an N restore coil having windings on every core wound with an N sense.

6. A magnetic switch as recited in claim 3 wherein the total number of turns in each winding of each parity coil is the product of the number of pairs of selecting coils and the number of turns in a P sense winding of one of said selecting coil windings.

7. A magnetic switch as recited in claim 5 wherein each of said parity coils are coupled to each of the magnetic cores to which they are not coupled by windings in a P sense by separate windings in an N sense.

8. In a magnetic commutator switch of the type wherein a selection is made of one out of a plurality of magnetic core groups and a magnetomotive force is simultaneously applied to all magnetic cores in said selected group to drive them from one to the other polarity of magnetic saturation, an improved means to inhibit all but a desired core in said selected core group from being driven comprising, a plurality of pairs of selecting coils, each pair of selecting coils having a binary number order position assigned thereto, each of said selecting coils being coupled to said cores by windings in accordance with a desired binary code, a binary one in said desired code being represented by a winding of one of a pair of coils and not the other being coupled to a core, a binary zero in said desired code being represented by a winding of said other coil of a pair of coils and not said one coil of said pair being coupled to a core, a pair of parity windings, one of said coils being inductively coupled by windings to certain ones of said cores in accordance with a desired parity code selected for said binary code, the other of said coils being coupled by windings to those of said cores to which said one of said parity coils is not coupled, means to apply currents selectively to one of each pair of selecting coils and one of said parity coils simultaneously with the application of said magnetomotive force to said core group to permit only the core to which none of the excited selecting coils are coupled to be driven.

9. A magnetic commutator switch as recited in claim 8 wherein the windings of said selecting coils and said parity coils are all of the same sense.

10. A magnetic commutator switch as recited in claim 8 wherein the selecting coil windings are of one sense and the parity coil windings are of the opposite sense.

11. A magnetic commutator switch as recited in claim 10 wherein said parity coils are also inductively coupled to each of said magnetic cores to which they are not already coupled by windings having the same sense as said selecting coil windings.

12. A magnetic switch comprising a plurality of magnetic cores, each core having a binary number assigned thereto, a plurality of pairs of selecting coils, each pair of selecting coils having a different order position assigned corresponding to the different order positions in the binary numbers assigned to said cores, each of said pairs of selecting coils including means coupled to each of said cores to represent a binary one or a binary zero on a core as called for by the order position of a pair of selecting coils in the binary number assigned to a core, a pair of parity coils, one of said parity coils being inductively coupled by windings having a given sense to certain ones of said cores as determined by a desired parity for the binary numbers assigned to said cores, the remaining one of said parity coils being inductively coupled by windings having a given sense to the remaining ones of said cores to which said one parity coil is not coupled, and means to selectively excite one of each of said pairs of selecting coils and one of said parity coils whereby a core which has the binary number assigned thereto and the parity determined by the excited selecting coils and parity coil is driven from magnetic saturation in one polarity toward magnetic saturation in the opposite polarity.

No references cited.